No. 658,057. Patented Sept. 18, 1900.
F. E. BOCORSELSKI.
UNIVERSAL JOINT.
(Application filed June 18, 1900.)
(No Model.)
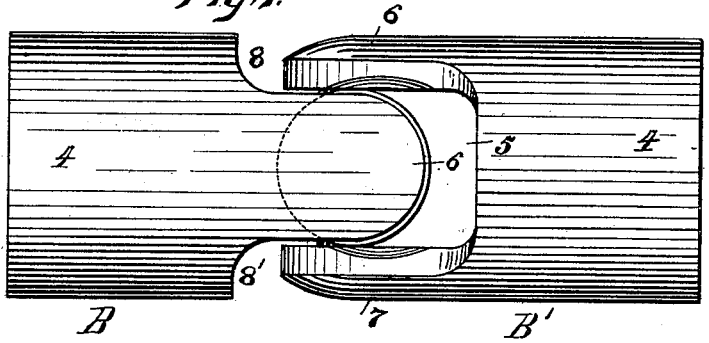
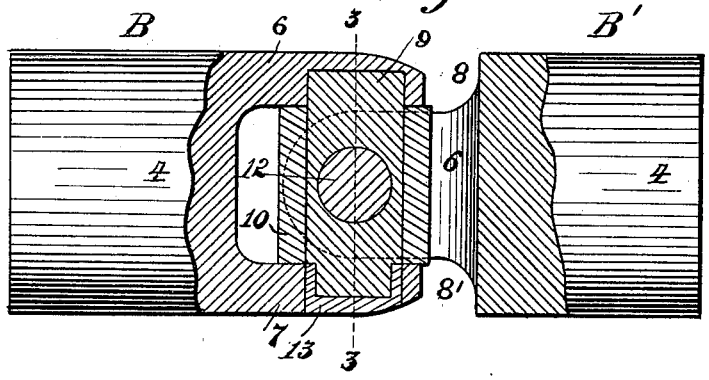
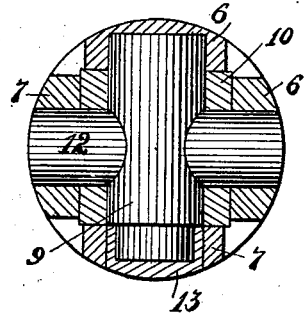
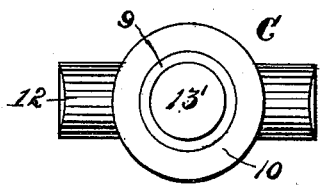
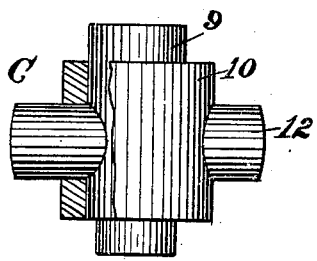
Witnesses
M. H. Flynn
L. C. Wood
Inventor
Frank E. Bocorselski
by E. Whitney
Atty.
THE NORRIS PETERS CO., PHOTO-LITHO., WASHINGTON, D. C.

UNITED STATES PATENT OFFICE.

FRANK E. BOCORSELSKI, OF HARTFORD, CONNECTICUT.

UNIVERSAL JOINT.

SPECIFICATION forming part of Letters Patent No. 658,057, dated September 18, 1900.

Application filed June 18, 1900. Serial No. 20,703. (No model.)

*To all whom it may concern:*

Be it known that I, FRANK E. BOCORSELSKI, a citizen of the United States of America, and a resident of Hartford, Hartford county, and State of Connecticut, have invented certain new and useful Improvements in Universal Joints, of which the following is a specification.

This invention relates to universal joints, one object of the invention being to furnish an improved, inexpensive, simplified, durable, and efficient universal joint of that class especially adapted for use as a flexible actuating connector between two obliquely-disposed rotative members, such as shafts, or between two rotative members subject to deflection or angular adjustment relatively within certain defined limits and to so construct the elementary features of said joint that all of them may be readily made on a screw-machine and may be quickly assembled.

The invention consists in certain novel elementary features and in certain details of construction, combination, and organization of the several parts, substantially as hereinafter described, and more particularly pointed out in the claims.

In the drawings accompanying and forming part of this specification, Figure 1 is a plan view of a universal joint embodying my invention. Fig. 2 is a side view of the same, partly in central longitudinal section. Fig. 3 is a cross-section, partly in elevation, of the universal joint, said section being taken on a line corresponding with the dotted line 3 3 in Fig. 2 and showing parts at the left of said line. Fig. 4 is a plan view of the coupling center or central connecting member between the bifurcated ends of the coupling heads or stubs, as seen from below in Fig. 5. Fig. 5 is a side elevation, partly in section, of said coupling center or connector; and Fig. 6 is a cross-section of the removable journal-bearing or cap which supports one end of one of the members of the connector.

Corresponding characters refer to like parts in all the figures of the drawings.

The universal joint or shaft-coupling embodying my present invention comprises in the construction and organization thereof illustrated in the accompanying drawings three essential elements, to wit: two bifurcated coupling-heads or shaft-sections which are designated in a general way by B and B', respectively, and which in some instances may constitute integral parts of the two rotative members or shaft-sections it is desired to couple together, and a gyroscopic coupling center or universal connector (designated in a general way by C) of peculiar construction and organization disposed between and operatively connecting the two bifurcated coupling-heads. In the drawings both coupling-heads or shaft-sections B and B' are shown of substantially the same general construction, and for convenience duplicate parts of the coupling-head are indicated by corresponding characters.

Each coupling-head, stub, or shaft-section consists of a cylindrical body portion of uniform diameter from end to end having a groove or slot 5 formed longitudinally and centrally in the inner end and extending transversely from side to side thereof, whereby to form a fork or bifurcation, the separated walls or prongs 6 and 7 of which are integral with the body portion 4 and have their outer faces curve in the direction of their widths and disposed in a common arc concentric to the longitudinal axis of said body portion and coincident with the circumferential arc of said body portion. The walls or prongs are slabbed off, as at 8 and 8', at opposite side edges, whereby to reduce their widths sufficiently to permit free movements thereof (when the shaft-sections are connected) between the walls or prongs of the adjacent shaft-sections, the inner faces of the prongs of each shaft-section being disposed in parallel planes and in parallelism with the longitudinal axis of said section and the extreme outer ends of said prongs being preferably rounded off for obvious reasons, and as will be understood by reference to Figs. 1 and 2 of the drawings.

The gyroscopic connector or coupling C between the two coupling-heads or shaft-sections consists of two concentric members 9 and 10, one of which, as 9, is in the nature of a roller or pin and the other of which is in the nature of a tube or sleeve and both of which have transverse central cylindrical openings or bores in register with one another, and a rectangularly-disposed solid cylindrical member 12, extending entirely through the two concentrically-disposed members 9 and 10. The roller or pin 9 has a sliding fit in the concentrically-disposed sleeve or center block 10, so as to permit it free insertion and removal. The member 10 has, as shown most clearly in Fig. 3, two rectangularly-disposed intersecting bores or openings extending entirely through the same, one of said bores being of considerably-less diameter than the other.

In the organization shown in the accompanying drawings one tubular member, as 9, is supported for rotative movement at opposite ends thereof in bearings in the opposing divided walls 6 and 7 of the coupling-head B, and the cylindrical member 12 is rotatably supported in said tubular member and is fixedly secured at its outer ends in perforations in the walls 6 and 7 of the coupling-head B'; but it will be obvious that both members 9 and 12 may be rotatably supported in bearings formed in the opposing walls 6 and 7 of their respective members.

In the construction and organization thereof shown in the accompanying drawings the member 9 is shown supported for rotative movements in bearings in the two walls 6 and 7 of the member B, one end thereof being seated in a socket formed in the inner face of one wall, as 6, which socket extends only partly through said wall, and the opposite end of said member 9 being shown diametrically reduced at 13' and seated in an annular bearing member 13, fixedly secured in a bore in the opposite wall 7, the bore in this wall being of slightly-greater diameter than the greatest diameter of the member 9 and permitting this member to be readily inserted through the bore and secured in its proper position. It will be obvious, however, that the member 9 may be symmetrical from end to end and be extended entirely through one or both walls without departure from this invention, in which case the tubular member 10, whose end faces bear against the inner faces of the opposing walls 6 and 7 of the coupling-head, will act as a stop for preventing longitudinal movement of the member 9 in its bearings. This slight modification is so obvious that it is deemed unnecessary to illustrate the same in the drawings.

The tubular member 10, which surrounds and is rotated with respect to the member 9 and which constitutes a strengthening-jacket, is of a length substantially equal to the distance between adjacent plane bearing-faces of the walls 6 and 7 of the coupling-head and, as before stated, has a transverse central bearing-socket formed therethrough in exact register with a similar socket formed transversely through the member 9. These sockets in the concentrically-disposed members 9 and 10 are of diameters slightly greater than the diameter of the cylindrical member 12, which is rotatably supported therein, and which member is connected at its opposite ends to the walls 6 and 7 of its respective coupling-head, said walls having axially-alined bores or sockets formed therethrough corresponding, substantially, in diameters to the diameter of said member 12, which, in assembling the parts, is driven through the bore in one wall and into the bore of the other wall where it is sweat in with its outer end faces flush with the outer faces of said walls.

In assembling the parts of my improved universal joint (assuming the registering bores to be properly formed in the two concentric members 9 and 10) the external tubular member 10 is placed in position between the plane faces of the walls 6 and 7 of the coupling-head with its axis coincident with the common axis of the two opposing bearing-sockets in said walls, after which the internal cylindrical member 9 is inserted through the bore in one wall, as 7, and through the external tubular member until the inner end thereof is properly seated in the bearing-socket in the other wall, as 6, after which the independent annular bearing member 13 is placed in the bore in the wall 7 around the reduced end of the member 9 and secured in said bore with its outer end flush with the outer face of the wall 7 by sweating or otherwise. Then the coupling-head B' is placed with its divided walls in proper working position with relation to the walls of the coupling-head B, and the solid cylindrical member 12 is then inserted through the bore of one wall of said head B', through the two concentric members 9 and 10 into the bore of the opposite wall of said head, it being preferably fixed at its ends in said bores by sweating or otherwise.

By the construction and organization above described it will be seen that when the coupling-head B' is moved with respect to the head B to change its angular relation thereto in the plane of the axis of the member 12 both the members 9 and 10 will be moved concurrently about arcs concentric to a common axis intersecting the axis of the member 12 or coincident with the longitudinal axis of the member 9, whereas if said coupling-head is moved at right angles to this direction of adjustment this member 12 will have a rotative movement with and with respect to the two members 9 and 10. Therefore it will be seen that in one adjustment of the coupling-heads relatively said members have a movement in the arc of a circle about one fixed axis—the longitudinal axis of the member 12—and in another adjustment of said members have a movement in the arc of a circle about another fixed axis—the longitudinal axis of the concentric members 9 and 10.

It will be understood from the foregoing and by reference to the drawings that the walls 6 and 7 are integral with the body portion 4 of their respective coupling-heads and that their inner adjacent faces are parallel to each other and to the longitudinal axis of the body portion 4, and by this construction they are capable of resisting great strains without distortion or breakage.

By the specific construction and organization of the elementary features of the universal joint hereinbefore described, and shown in the accompanying drawings, and in which this invention resides—i. e., forming both prongs of each fork integral with the shaft-section and having their outer faces disposed in a common arc concentric to the axis of the body portion and coincident with the circumferential arc of said body portion and securing the shaft-sections together in the specific manner and by the specific means described—I secure the maximum strength and solidity, am enabled quickly to assemble the parts, have no pieces in connection with the shaft-sections liable to become displaced or broken off, and have all the parts of the joint located within the circumferential arc of the shaft-sections, which is a matter of extreme importance, especially where a multiplicity of the joints are used in connection with the shafts of a multiple drilling-machine where it is necessary to economize in space and locate the shafts in the closest proximity.

It is not herein desired specifically to claim two coupling-heads having forked members, a block interposed between the forked members, two bushings rigidly supported in openings at two adjacent sides of the block, the axes of which intersect at right angles, and bolts passing through the forked members, block, and bushing, as this constitutes the subject-matter of the claims in a separate application, Serial No. 16,876, filed May 16, 1900, to which reference may be had.

I claim—

1. A universal joint consisting of two cylindrical shaft-sections of uniform diameter from end to end and each having an integral fork at the inner end thereof the outer faces of the prongs of which are disposed in a common arc coincident with the circumferential arc of the body portion of said section; two concentric members one of which extends through the other and is connected at its ends to the prongs of one fork; and a cylindrical member extending through the concentric members and having its ends connected to the prongs of the other fork.

2. A universal joint consisting of two cylindrical forked shaft-sections the forks of each section of which are formed integral with the body portion and have their outer faces curved in the direction of their widths in a common arc coincident with the circumferential arc of the body portion and having their inner faces parallel with the longitudinal axis of said section; and a coupling-center having two relatively-transverse members one of which extends through and is supported for rotative movement in the other and one of which is fixedly connected at opposite ends to the fork of one section and the other of which is rotatably supported by the fork of the other section.

3. A universal joint comprising two cylindrical forked shaft-sections the prongs of one fork of which have registering bores extending entirely through the same, and one prong of the other fork of which has a cylindrical socket formed only part way through the same from the inner face and the other prong of which has a bore registering with this socket; a tubular member supported between the two forks; a bearing member seated in the bore which registers with the socket; a cylindrical member extending through the tubular member and having one end reduced and seated in the bearing member and having its opposite end seated in the socket of one fork; and another cylindrical member extending transversely through the two first-mentioned members and having its opposite ends seated in the registering bores of the other fork.

4. A universal joint comprising two cylindrical forked shaft-sections the forks and body portions of each of which are integral and the outer faces of which are curved widthwise in a common arc coincident with the circumferential arc of the body portion; and two cylindrical connecting members one of which extends through and is rotatively supported in the other and has its ends supported in the prongs of one fork with its outer end faces flush with the outer faces of said prongs, and the other of which is rotatably supported in the prongs of the other fork and has a diametrically-reduced end, substantially as described.

5. A universal joint comprising two cylindrical forked shaft-sections, the forks and body portions of each of which are integral and have their outer faces curved widthwise in a common arc coincident with the circumferential arc of the body portion; two cylindrical connecting members, one of which extends transversely through and is rotatably supported in the other and has its ends supported in the prongs of one fork with its outer end faces flush with the outer faces of said prongs, and the other of which has its opposite ends extending into the prongs of the other fork for rotation and has a diametrically-reduced end; and a cylindrical bearing member fixedly secured in one fork and supporting the diametrically-reduced end of the last-mentioned member.

Signed by me at Hartford, Connecticut, this 16th day of June, A. D. 1900.

FRANK E. BOCORSELSKI.

Witnesses:
L. C. Wood,
E. C. Whitney.